United States Patent
Yamamoto et al.

(10) Patent No.: US 7,542,182 B2
(45) Date of Patent: Jun. 2, 2009

(54) IMAGE PICKUP APPARATUS WITH LIGHT EMISSION CONTROL ADAPTED FOR LIGHT-RECEIVING CHARACTERISTICS

(75) Inventors: Isao Yamamoto, Kyoto (JP); Koichi Miyanaga, Kyoto (JP); Takahiro Ota, Kyoto (JP)

(73) Assignee: Rohm Co., Ltd. (JP)

(*) Notice: Subject to any disclaimer, the term of this patent is extended or adjusted under 35 U.S.C. 154(b) by 1001 days.

(21) Appl. No.: 10/941,561

(22) Filed: Sep. 15, 2004

(65) Prior Publication Data

US 2005/0057786 A1    Mar. 17, 2005

(30) Foreign Application Priority Data

Sep. 16, 2003   (JP)   ............... 2003-323175

(51) Int. Cl.
*H04N 1/04* (2006.01)
(52) U.S. Cl. ............... 358/474; 358/475; 358/509; 382/254; 382/167
(58) Field of Classification Search ............ 358/474, 358/475, 509, 1.2, 1.9, 505, 501, 512, 515, 358/518, 523, 527; 382/167, 254, 274
See application file for complete search history.

(56) References Cited

U.S. PATENT DOCUMENTS 6,654,494 B1* 11/2003 Sawada et al. ............ 382/167

2003/0016406 A1* 1/2003 Hoshino et al. ............ 358/509
2004/0190092 A1* 9/2004 Silverbrook et al. ........ 358/539
2007/0146356 A1* 6/2007 Ladouceur ................. 345/207
2008/0180544 A1* 7/2008 Drader et al. ............ 348/223.1

FOREIGN PATENT DOCUMENTS

| CN | 1405619 | 3/2003 |
| JP | 2002-116481 | 4/2002 |
| JP | 2002-122794 | 4/2002 |
| JP | 2003-66519 | 3/2003 |

OTHER PUBLICATIONS

Chinese Office Action for Chinese Patent Application No. 200410078944.7 mailed Dec. 7, 2007 with English Translation.
Japanese Office Action with English translation dated Aug. 29, 2006.

* cited by examiner

*Primary Examiner*—Negussie Worku
(74) *Attorney, Agent, or Firm*—Cantor Colburn LLP

(57) ABSTRACT

An electronic flash light is emitted from a camera by causing light-emitting diodes corresponding to red, green and blue simultaneously. Light emission of the light-emitting diodes corresponding to respective colors is controlled in accordance with the light-receiving characteristics of the light-receiving elements. For example, by adjusting the on and off duration ratio of switches in accordance with the light-receiving characteristics, the quantity of light emitted by the light-emitting diodes is adjusted.

3 Claims, 4 Drawing Sheets

IMAGE PICKUP APPARATUS WITH LIGHT EMISSION CONTROL ADAPTED FOR LIGHT-RECEIVING CHARACTERISTICS

BACKGROUND OF THE INVENTION

1. Field of the Invention

The present invention relates to an image pickup technology in which light-emitting elements produce an electronic flash light when picking up an image.

2. Description of the Related Art

A digital camera picks up an image of a subject by a photo detector such as a charge-coupled device (CCD). A CCD is provided with a photo diode that converts outdoor daylight into electric charges by the photoelectric effect. Charges generated according to the intensity of light record image information, i.e. performs imaging. A CCD itself is an element sensing the intensity of light and cannot capture color information of a subject image.

For this reason, a colored filter is usually provided for one CCD. For example, a color filter corresponds to, for example, a primary color such as red, green and blue (RGB). The color filter has the property of transmitting only the color it corresponds to. By combining CCDs and color filters, a digital camera is capable of capturing color information of a subject as well as the intensity of light.

In recent years, as the pixel resolution of a CCD is improved, many of battery-driven portable appliances such as portable telephones and personal data assistants (PDA) now have a built-in digital camera function. Many of these appliances use light-emitting diodes (LED) to provide backlight of a light-emitting device such as a liquid crystal display (LCD) and an electronic flash.

[Patent Document No. 1]

Japanese Laid-Open Patent Application No. 2002-116481

SUMMARY OF THE INVENTION

In capturing color information of a subject image, it is to be noted that the photo sensitivity of a CCD differs from color to color. For example, a CCD corresponding to blue and a CCD corresponding to yellow receiving light of the same quantity do not necessarily generate the same amount of charges. This is because a color filter does not transmit the entirety of light and the transmittance thereof is different from color to color.

The present invention is done in consideration of the problem discussed above and its object is to provide an image pickup technique in which an image true to a subject's original color is taken using an electronic flash by driving light-emitting elements in consideration of the characteristics of light-receiving elements.

The image pickup apparatus according to the present invention is provided with a plurality of light-emitting elements corresponding to respective colors, an image pickup unit and a light-emitting circuit for driving the plurality of light-emitting elements so as to provide an electronic flash light. The light-emitting circuit generates an electronic flash light by adjusting the quantity of light emitted by the light-emitting elements in accordance with the light-receiving characteristics of the image pickup unit.

In accordance with the present invention, it is possible to pick up an image true to a subject's original color by emitting an electronic flash light considering the characteristics of the light-receiving elements.

DETAILED DESCRIPTION OF THE INVENTION

Figure 1:
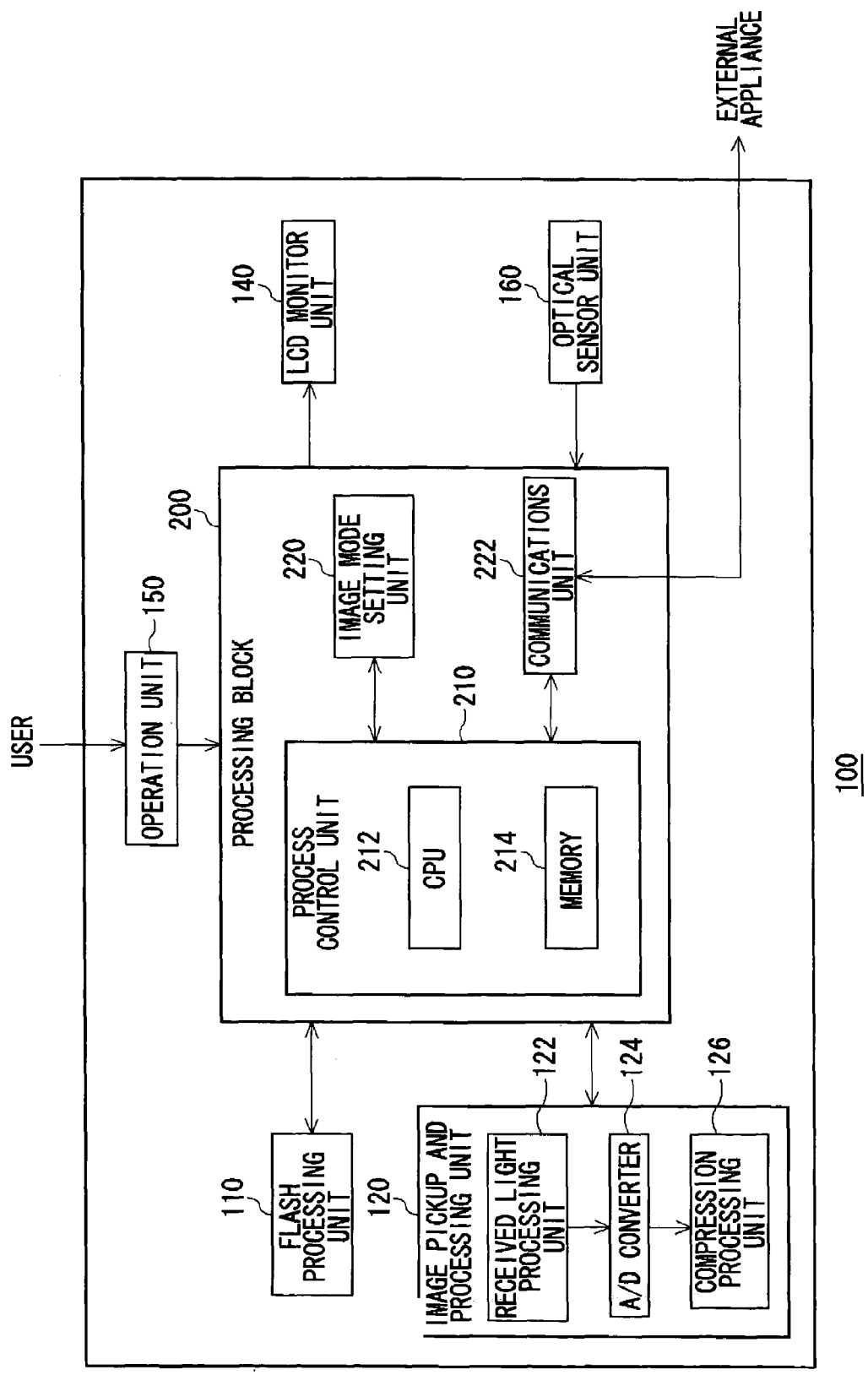
FIG. 1 is a functional block diagram of a digital camera according to an embodiment of the present invention.

FIG. 1 is a functional block diagram of a digital camera according to an embodiment of the present invention. The digital camera 100 includes a flash processing unit 110, an image pickup and processing unit 120, an LCD monitor 140, an operation unit 150, an optical sensor unit 160 and a processing block 200.

The image pickup and processing unit 120 picks up and processes images in response to an instruction from the processing block 200. The image processing unit 120 includes a received light processing unit 122, an A/D converter 124 and a compression processing unit 126. The received light processing unit 122 forms an image of a subject by receiving light from the subject, and converts the formed image into an electrical signal. The received light processing unit 122 includes a lens, a CCD and a color filter (not shown). The A/D converting unit 124 converts the electrical signal into a digital signal. The compression processing unit 126 compresses the digital image data of the subject.

The flash processing unit 110 controls emission of a flash light in response to an instruction from the processing block 200. The operation unit 12 includes a power switch, a release switch and the like that allow the user to pick up images and set various operation modes. The LCD monitor 140 displays image pickup/play modes, a zoom scale, date and time and the like in addition to displaying the image of the subject. An optical sensor unit 160 senses ambient light. The optical sensor unit 160 senses light of a predetermined quantity from a predetermined orientation, and notifies the processing block 200 accordingly. The processing block 200 makes a determination as to whether emission of a flash light is necessary by referring to the light detected by the optical sensor unit 160.

The processing block 200 includes an imaging mode setting unit 220 and a communications unit 222 in addition to the process control unit 210. The process control unit 210 controls the whole process of the digital camera 100. The process control unit 210 includes a CPU (Central Processing Unit) 212 and a memory 214. The imaging mode setting unit 220 sets various imaging modes. The term "imaging mode" refers to a set of settings related to image pickup. The communications unit 222 controls communication with external devices. The digital camera 100 need not be an appliance designed only as a digital camera but may be digital camera capabilities provided in a portable telephone, a personal digital assistant (PDA) and the like.

Figure 2:
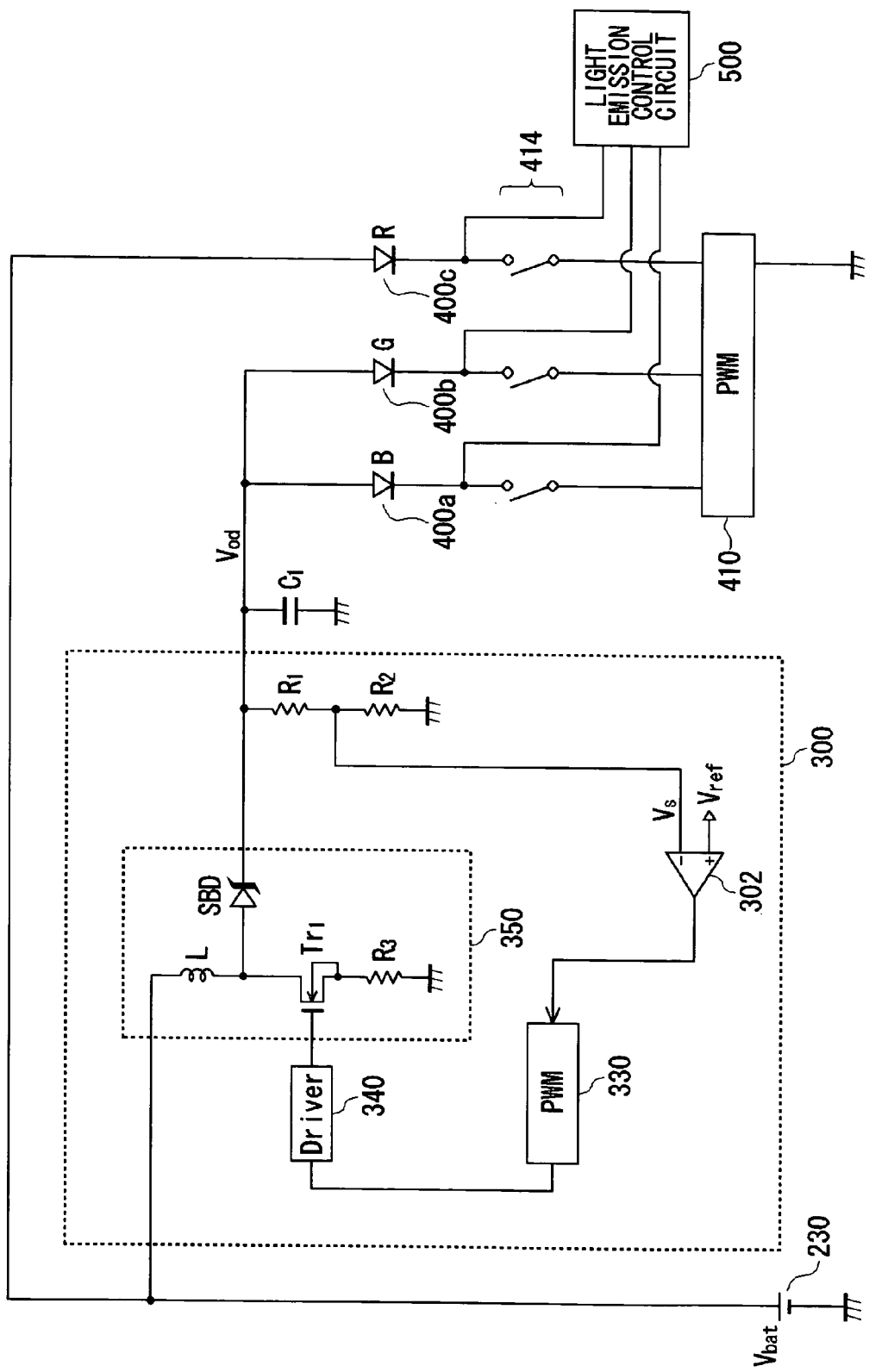
FIG. 2 shows how emission of light is controlled.

FIG. 2 shows how emission of light is controlled. FIG. 2 generally corresponds to blocks such as the flash processing unit 110 and the LCD monitor 140. A shared boost converter 300 boosts an input voltage according to a switching strategy, the input voltage being a battery voltage Vbat of a lithium ion battery 230, and outputs a preparatory boosted voltage Vod. The shared boost converter 300 is connected to a blue light-emitting diode 400a and a green light-emitting diode 400b. The preparatory boosted voltage Vod output from the shared boost converter 300 is fed to these LEDs. Each of these LEDs uses the preparatory boosted voltage Vod as a driving voltage. Alternatively, each of these LED boosts or lowers the preparatory boosted voltage Vod to turn it into a driving voltage.

The red light-emitting diode 400c is directly connected to the lithium ion battery 230. The red light-emitting diode 400c is driven by a battery voltage Vbat lower than the preparatory boosted voltage Vod. This is because the forward voltage of the red light-emitting diode 400c is lower than that of the blue light-emitting diode 400a and the green light-emitting diode 400b. The blue light-emitting diode 400a, the green light-emitting diode 400b and the red light-emitting diode 400c are generically referred to as light-emitting diodes 400. The boost chopper circuit 150 charges energy in and discharges energy from a coil L by an on and off operation of the transistor Tr1, thus boosting the battery voltage Vbat to a preparatory boosted voltage Vod. A drain current flows through a resistor R3 via the coil L while the transistor Tr1 is turned on in the boost chopper circuit 350, allowing the battery voltage Vbat to store magnetic energy in the inductance 114. When the transistor Tr1 is turned off subsequently, the magnetic energy stored in the coil L while the transistor Tr1 is turned on is discharged as electric energy and turns into a current that flows through a Schottky barrier diode SBD. The voltage generated in the coil L is positively superimposed on the battery voltage Vbat and stabilized by a smoothing capacitor C1 before being output as the preparatory boosted voltage Vod.

The boost ratio of the preparatory boosted voltage Vod output by the boost chopper circuit 350 is determined by a duration ratio between an on period and an off period of the transistor Tr1 operated as a switch. A pulse width modulation (PWM) circuit 330 produces the on and off duration ratio of the switch. Assuming that the on and off switching period of the switch is T and the on duration of the switch is Ton, the PWM circuit 330 generates a pulse signal with a duty ratio of Ton/T. A driver 340 turns the transistor Tr1 on and off in response to the pulse signal generated by the PWM circuit 330. When the pulse signal is at a high (H) level, the transistor Tr1 is turned on. When the pulse signal is at a low (L) level, the transistor Tr1 is turned off.

The pulse width of the pulse signal generated by the PWM circuit 330 varies in accordance with an output from the error amplifier 302. The error amplifier 302 compares a detected voltage Vs derived from dividing the preparatory boosted voltage Vod by two voltage dividing resistors R1 and R2 with a reference voltage Vref from a reference voltage source, and amplifies an error between the reference voltage Vref and the detected voltage Vs so as to feed a resultant voltage back to the PWM circuit 300. The PWM circuit 330 modulates the pulse width of the pulse signal according to the output of the error amplifier 302 by controlling an on duration Ton of the switch, and matches the detected voltage Vs with the reference voltage Vref by feedback control.

The light-emitting diodes 400 provide backlight for the LCD monitor 140. The light-emitting diodes 400 also provide an electronic flash light for taking photographs. Switches 414 are turned on and off in response to a signal from an external source (not shown). The switches 414 are turned on so that the light-emitting diodes 400 are controlled by the PWM circuit 410 for control of backlight emission. By controlling the blue light-emitting diode 400a, the green light-emitting diode 400b and the red light-emitting diode 400c to emit the same quantity of light, a white light is produced. The PWM circuit 410 controls the quantity of light produced by the individual LEDs by controlling a current fed to the blue light-emitting diode 400a, the green light-emitting diode 400b and the red light-emitting diode 400c. By turning the switch 414 on and off in accordance with a signal from an external source (not shown), it is possible to control the quantity of light emitted by the individual LEDs of the light-emitting diodes 400.

A light emission control circuit 500 is provided to cause the blue light-emitting diode 400a, the green light-emitting diode 400b and the red light-emitting diode 400c to emit an electronic flash light for taking photographs. The present invention relates to a method of controlling the light-emitting diodes 400 simultaneously to emit an electronic flash light. The method will be discussed in detail by referring to FIGS. 3 and 4.

The image pickup apparatus according to the embodiment of the present invention comprises a plurality of light-emitting elements corresponding to respective colors, an image pickup unit, a memory for storing parameters for driving the plurality of light-emitting elements to emit a high-luminance electronic flash light for taking photographs and a light-emitting circuit for reading the parameters and driving the plurality of light-emitting elements in accordance with the parameters. The parameters are set so as to correct the light-receiving characteristics of the image pickup unit.

It is assumed that the blue light-emitting diode 400a, the green light-emitting diode 400b and the red light-emitting diode 400c are controlled simultaneously to emit light and a white electronic flash light is produced by combining the light of the respective colors. Even if the CCD elements corresponding to red, green and blue receive the same quantity of light, it is not ensured that the photodiodes of the CCD elements generate the same amount of electric charges. For example, when the photosensitivity of a CCD element corresponding to blue is greater than the photosensitivity of a CCD element corresponding to the other colors, a bluish photographic image is taken even if a white flash light is used to take a photograph.

It occurred to the inventor of the present invention that an image true to a subject's original color is obtained by controlling the quantity of light emitted by the light-emitting diodes 400 such that the light-receiving characteristics of the CCD are corrected, instead of by producing a pure white flash light. In relation to the example given above, it should be ensured that the quantity of light emitted by the green light-emitting diode 400b and the red light-emitting diode 400c is larger than that of the blue light-emitting diode 400a. Given that the characteristics of the light-receiving elements are such that the photosensitivity of the CCD element to a blue light is high, the characteristics of the light-receiving elements are corrected by adjusting the quantity of light emitted by the light-emitting elements in such a way as to reduce the quantity of light emitted by the blue light-emitting diode 400a. As a result of this, a photographic image true to a subject's original color is obtained.

Conventionally, a main target sought to be achieved in developing a light-emitting element is improvement in light-emitting performance. A new viewpoint introduced in the present invention is to adjust the quantity of light emitted by light-emitting elements in consideration of the characteristics of the light-receiving elements. The characteristics of the light-receiving elements may be registered in the form parameters as a result of factory experiments.

The parameters may be set such that color-to-color variance in the light-receiving characteristics of an image pickup unit is cancelled. The image pickup apparatus may be provided with a plurality of light-emitting elements corresponding to respective colors, an image pickup unit and a light-emitting circuit for causing the light-emitting elements to emit a high-luminance electronic flash light for taking photographs. The light-emitting circuit may drive the plurality of light-emitting elements by adjusting the quantity of light to cancel color-to-color variance in the light-receiving characteristics of the image pickup unit.

Figure 3:
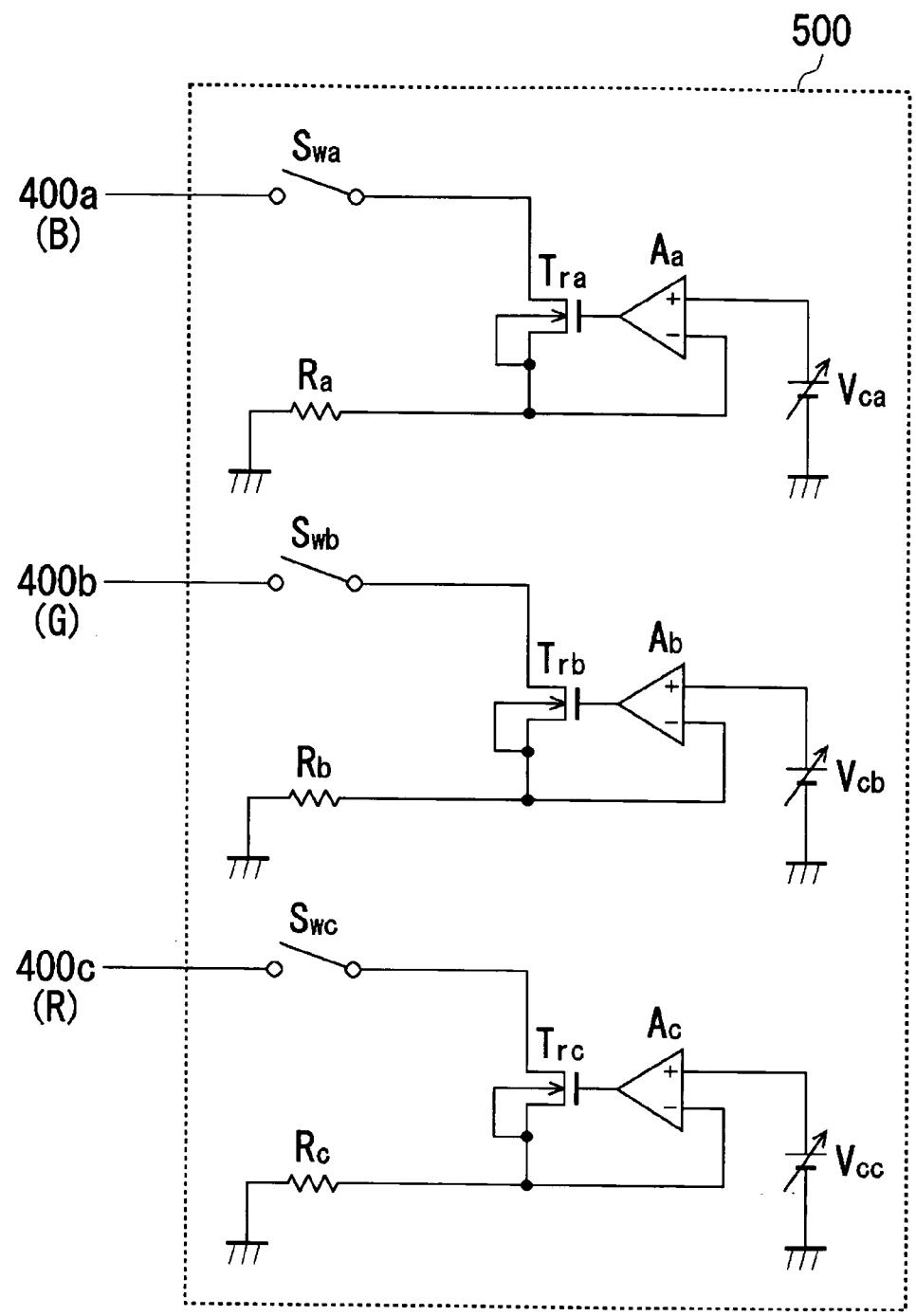
FIG. 3 shows a construction of a light emission control circuit.

FIG. 3 shows a construction of a light emission control circuit 500. The blue light-emitting diode 400a, the green light-emitting diode 400b and the red light-emitting diode 400c are connected to switches Swa, Swb and Swc, respectively (hereinafter, these switches may be collectively referred to as switches Sw). The switches Swa, Swb and Swc are connected to transistors Tra, Trb and Trc (hereinafter, these transistors may be collectively referred to as transistors Tr). The transistors Tr shown are negative-metal oxide semiconductor (N-MOS) transistors. The transistors Tra, Trb and Trc are connected to resistors Ra, Rb and Rc (hereinafter, these resistors may be collectively referred to as resistors R). The transistors Tra, Trb and Trc are connected to operational amplifiers Aa, Ab and Ac (hereinafter, these operational amplifiers may be collectively referred to as operational amplifiers A). The non-inverting input of the operational amplifiers Aa, Ab and Ac are connected to variable constant voltage sources Vca, Vcb and Vcc (hereinafter, these variable constant voltage sources may be collectively referred to as variable constant voltage sources Vc). The inverting input of the operational amplifiers Aa, Ab and Ac are connected to the resistors Ra, Rb and Rc, respectively.

A description will be given of a method of controlling flash light emission, by taking an example of the blue light-emitting diode 400a. As shown in the figure, one end of the resistor Ra is grounded so that the potential thereof is ideally 0. According to the operating principle of the operational amplifier demands, the potential at the other end of the resistor Ra is ideally the same as the potential at which the variable constant voltage source Vca is set. Given that the transistor Tra is turned on, a current of a predetermined level is fed to the light-emitting diode 400a for emission of light, when the switch Swa is turned on. The green light-emitting diode 400b and the red light-emitting diode 400c are controlled similarly.

A description will be given of various methods, executed in the image pickup and processing unit 120, of adjusting the quantity of light emitted by the light-emitting diodes 400 in accordance with the light-receiving characteristics of the light-receiving elements.

1. A control circuit such as a PWM circuit (not shown) may adjust the quantity of light emitted by the light-emitting diodes 400, by controlling the on and off of the switches Sw. Parameters corresponding to the light-receiving characteristics of the light-receiving elements may be stored in the memory 214 so that a control circuit (not shown) adjusts the ratio of duration of the on period and off period of the switches Sw in accordance with the parameters.

2. The current fed to the light-emitting diodes 400 varies in accordance with the resistance of the resistors R. Accordingly, by adjusting the resistance of the resistors R in accordance with the light-receiving characteristics of the light-receiving elements, the quantity of light emitted by the light-emitting diodes 400 is adjusted.

3. The current fed to the light-emitting diodes 400 varies in accordance with the voltages set in the variable constant voltage sources Vc. Accordingly, by adjusting the voltage set in the variable constant voltage sources Vc in accordance with the light-receiving characteristics of the light-receiving elements, the quantity of light emitted by the light-emitting diodes 400 is adjusted.

4. The on and off duration ratio of the transistors Tr may be controlled by controlling the voltages set in the variable constant voltage sources Vc using a control circuit such as a PWM circuit (not shown). With this, the quantity of light emitted by the light-emitting diodes 400 is adjusted. As mentioned before, the parameters corresponding to the light-receiving characteristics of the light-receiving elements may be stored in the memory 204 so that the on and off duration ratio of the transistors Tr is adjusted in accordance with the parameters.

Figure 4:
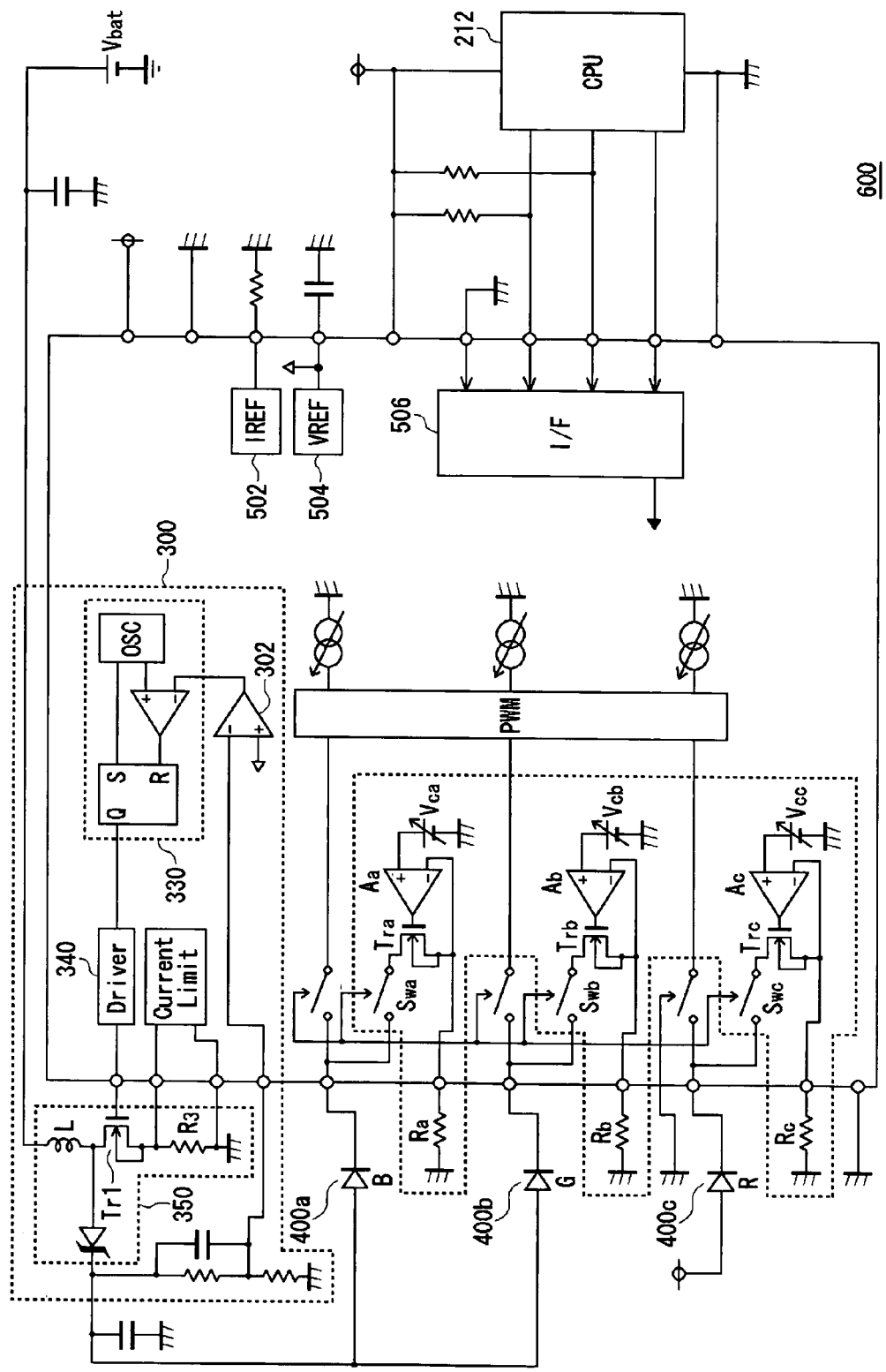
FIG. 4 shows a light emission control chip in which a circuit for driving the light-emitting elements is built into one chip.

FIG. 4 shows a construction of a light emission control IC 600 in which a circuit for driving the light-emitting elements is built into one chip. The light emission control IC 600 includes an interface circuit 506, an Iref circuit 502 and a Vref circuit 504.

The interface circuit 210 receives a signal from the CPU 212 and outputs a signal to the CPU 212. The Iref circuit 502 and the Vref circuit 504 generate a reference current and a reference voltage, respectively. The voltage Vref generated by the Vref circuit 504 is input to the error amplifier 302.

According to the embodiment, the quantity of light emitted by the light-emitting elements is adjusted in accordance with the light-receiving characteristics of the light-receiving elements. Particularly, it is to be appreciated that a photographic image true to a subject's original color is taken using an electronic flash as a result of controlling the quantity of light emitted by the light-emitting elements corresponding to respective colors, in accordance with the light-receiving characteristics of the light-receiving elements corresponding to respective colors.

Described above is an explanation based on the embodiment. The embodiment of the present invention is only illustrative in nature and it will be obvious to those skilled in the art that various variations in constituting elements and processes are possible within the scope of the present invention.

What is claimed is:

1. An image pickup apparatus comprising:
    a plurality of light-emitting elements corresponding to respective colors;
    an image pickup unit;
    a boost converter for boosting an input voltage to be supplied to the light-emitting elements;
    a memory for storing parameters for driving said plurality of light-emitting elements to emit a high-luminance electronic flash light for taking photographs; and
    a light-emitting circuit for reading the parameters and driving said plurality of light-emitting elements in accordance with the parameters, wherein
    the light emitting circuit comprises:
        a plurality of transistors for controlling light emission of the plurality of light-emitting elements;
        a plurality of operational amplifiers having their outputs respectively connected to the gates of the plurality of transistors and having their inverting inputs respectively connected to the drains of the plurality of transistors; and
        a plurality of variable constant voltage sources respectively connected to the on-inverting inputs of the plurality of operational amplifiers and controlling the on and off of the plurality of transistors based on preset voltages determined by the parameters, and wherein
    the parameters are set so as to correct the light-receiving characteristics of said image pickup unit.

2. The image pickup apparatus according to claim 1, wherein the boost converter compares a difference between a voltage determined by an output voltage and a reference voltage with an output value of an oscillator, so as to control the operation of boosting the input voltage in accordance with a result of comparison.

3. The image pickup apparatus according to claim 1, further comprising:
    an optical sensor unit for sensing ambient light;
    a process control unit for determining whether emission of a flash light is necessary by referring to a result of sensing and for driving the light-emitting circuit.

* * * * *